United States Patent [19]

Miller et al.

[11] 3,914,060

[45] Oct. 21, 1975

[54] CONNECTING STRUCTURE FOR FRAMES, SCAFFOLDS, LATTICE STRUCTURE OR THE LIKE

[75] Inventors: Hermann Miller, Krefeld; Ernst Kühn, Dusseldorf, Germany

[73] Assignee: Mannesmann-Rohrenwerke AG, Dusseldorf, Germany

[22] Filed: Dec. 5, 1973

[21] Appl. No.: 421,866

[30] Foreign Application Priority Data

Dec. 7, 1972 Germany............................ 2260417

[52] U.S. Cl. ................. 403/171; 403/192; 403/342
[51] Int. Cl.² .......................................... F16B 7/00
[58] Field of Search .......... 403/171, 342, 172, 176, 403/170, 173, 174, 178, 192, 200

[56] References Cited
UNITED STATES PATENTS 2,567,036  9/1951  Shannon............................ 403/342

3,751,077  8/1973  Hiszpanski...................... 285/286 X

FOREIGN PATENTS OR APPLICATIONS 149,459  8/1920  United Kingdom................. 403/342
55,868  5/1967  East Germany.................... 403/174

*Primary Examiner*—Andrew V. Kundraf
*Attorney, Agent, or Firm*—Ralf H. Siegemund

[57] ABSTRACT

Frame elements such as tubular sections converging towards a connecting point are connected to a support element by means of sleeves held on studs which extend from the support element, and mutually engaging annular stops prevent removal of the sleeves from the studs. The respective sections are threaded into the sleeves.

2 Claims, 2 Drawing Figures

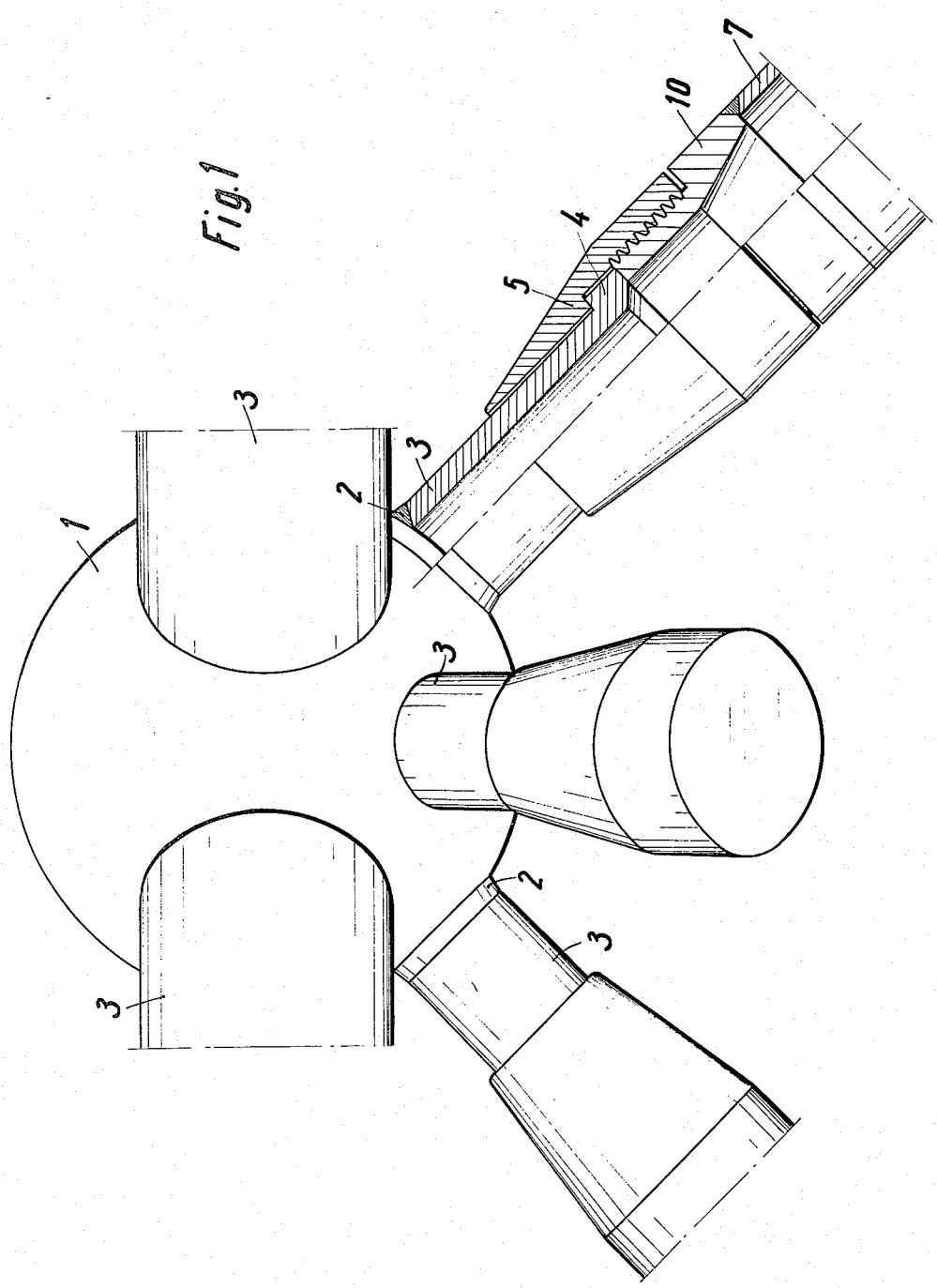

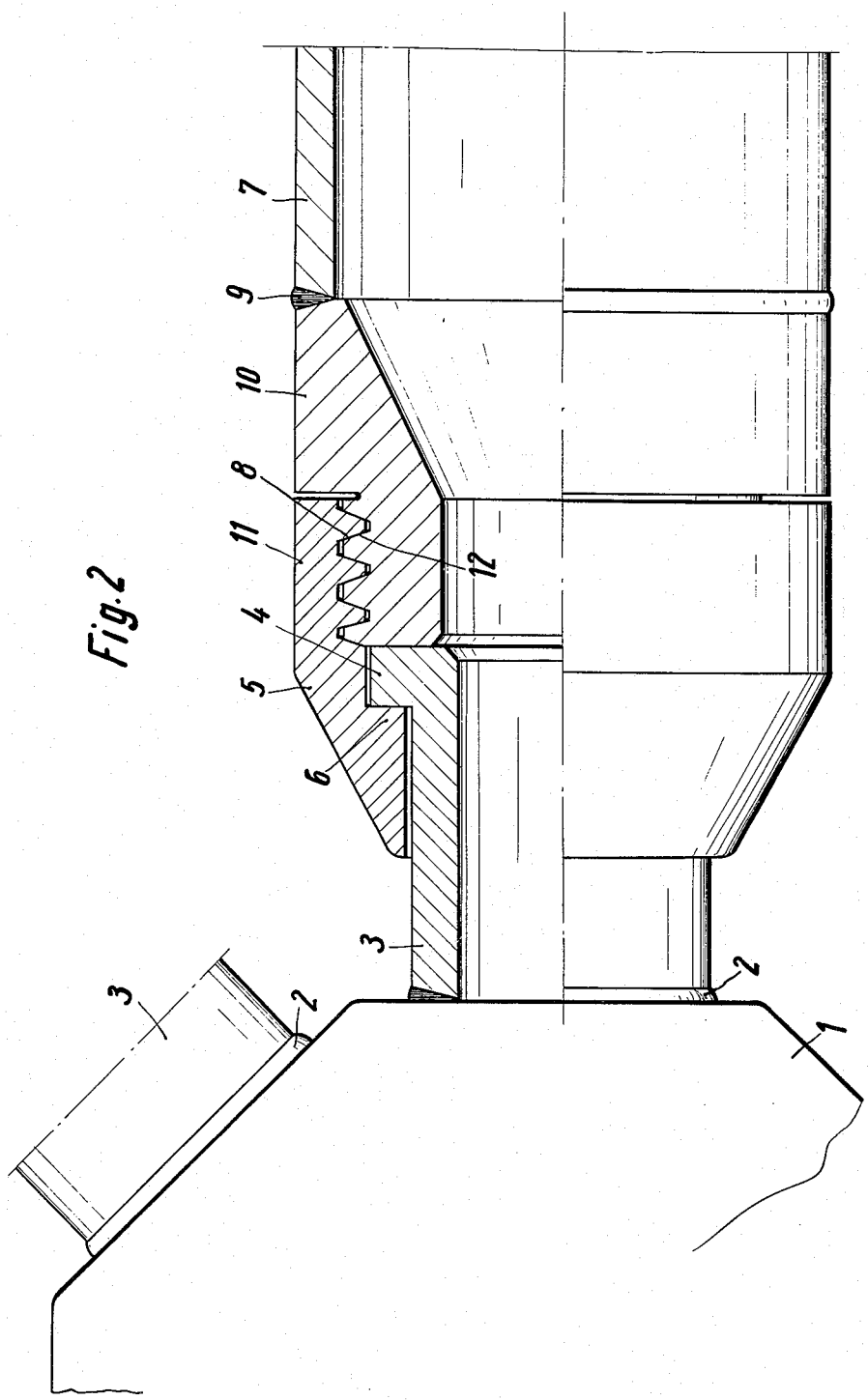

CONNECTING STRUCTURE FOR FRAMES, SCAFFOLDS, LATTICE STRUCTURE OR THE LIKE

BACKGROUND OF THE INVENTION

The present invention relates to multiple joint structure, for frames, lattice structures, scaffolds or the like and constructed from tubular sections or section rods or bars which are to be interconnected by means of interconnecting elements.

Frames and other comparable structures are constructed from sections in that these sections are welded to connecting elements, the latter being for example cup shaped. Such a construction is quite advantageous but requires high skilled welding at the construction site, and that requirement is, unfortunately, a limitation on the usage of such structure and its design principle.

Other connecting structures involve sections threaded into a connecting element. The sections are hollow i.e. tubular with internal threading, and bolts are threaded partially into the ends of such a tubular section but projecting partially therefrom for threading into a connection element. The tubular sections have lateral openings through which the bolts are engaged for tightening them. The assembly of a frame on that basis is quite a cumbersome procedure and, of course, requires special tooling. Moreover, the openings distract from the appearance of the fram when assembled and increase the amount of maintenance necessary.

SUMMARY OF THE INVENTION

It is an object of the present invention for improving the construction of joints and connecting structure for section elements of frames, scaffolds or the like in that the advantages of a smooth welding construction is combined with features permitting on-site assembly by more or less unskilled workers.

In accordance with the preferred embodiment of the invention it is suggested to provide a support element having short, preferably tubular studs which extend from the support element in different directions corresponding to the different directions from which section elements are expected to converge. Each of the studs has a radially outwardly extending collar or flange at its (axial) outer end serving as axial stop for a sleeve which sits partially on the stud and has an inwardly directed ridge which engages the stud flange from behind. The sleeve can rotate on the stud and has a limited range of axial displacement thereon but cannot be slipped off. The portion of the sleeve projecting from the stud, away from the support element, is provided with an internal thread for threadedly receiving the end of a section bar or tube.

The section bars or tubes are shorter than needed, and threaded end pieces are welded thereto at both ends for insertion in the sleeves.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a view of a connecting structure with support element, studs and threaded sleeves in accordance with the preferred embodiment of the invention and showing one stud-sleeve combination in longitudinal section view with inserted section element; and FIG. 2 is an enlargement of a portion of the construction shown in FIG. 1, showing also the respective stud-sleeve-section tube, partially in longitudinal section, partially in side elevation.

Proceeding now to the detailed description of the drawings, the figures show a multiple joint connection element 1 of polyhedral structure. Studs 3, preferably of tubular configuration are welded to element 1 at 2 and extend outwardly therefrom. The outer end of each stud is provided with a flange or collar 4.

Sleeves 5 are disposed respectively on studs in that each sleeve has an internal collar or ridge 6 overlapping and engaging flange 4 from the rear. Sleeve 5 can turn on stud 3 and can be axially displaced towards the support element, but upon engagement of collars 4 and 6 further displacement of the sleeve away from support 1 is inhibited. Thus the annular elements 4 and 6 being respectively integral with stud and sleeve, serve as stops for mutual engagement thereby (a) limiting axial displacement of sleeve 5 on stud 3 and (b) preventing the sleeve from falling off the stud.

A portion of sleeve 5 is provided with an internal thread. A section rod or tube 7 having a mating thread 8 can be threaded into sleeve 5. Particularly, each rod or tube 7 is provided with a threaded end piece 10 which has been welded to rod or tube 7 at welded joint 9. Each tube or rod 7 is provided on both ends, with end pieces such as 10, so each tube or rod 7 can be connected to two element such as 1.

The figures show the tubes 7 threadedly fastened to sleeves 5. For release, a sleeve 5 is turned to unthread the sleeve for the respective tube. The sleeve has a tapered end and a cylindrical portion, the latter may serve for engagement by a wrench. Upon unthreading sleeve 5 slides axially on stud 3 towards support element 1 until removed from tube 7, so that the tube can be removed laterally without e.g. displacing the support element 1, and without axial displacement of the tube away from element 1.

The support element 1 is made first and prior to welding studs 3 to element 1 sleeves 5 are respectively slipped over the studs. After welding the sleeves remain on the studs and cannot fall off. If, as was explained above, the sleeves can slide axially on the studs for a distance at least as large as the axial length of the threaded portion (or of the portion expected to be used), the section elements can be inserted even after the relative location of the support elements 1 has already been fixed in the frame that is being erected.

The sleeves can be threaded manually or with any kind of wrench, and tightening the section elements in the sleeves does not require special tooling. Also, no openings are need anywhere for manipulating any internally located bolt or the like.

Turning now to some detail of the sleeve-section element assembly, it can be seen that the outer diameter of the cylindrical portion of sleeve 5 is the same as the outer diameter of tubular section 7. The welded-on end piece 10 has also a cylindrical portion of the same diameter by means of which piece 10 is welded to and flush with tube 7.

The threaded portion of end piece 10 is of smaller diameter to be received in sleeve 5, there being a shoulder in the transition between cylindrical and threaded portions of end piece 10. After having completed threaded insertion of the threaded portion of end piece 10 into the respective sleeve 5, the cylindrical portion of end piece 10 is flush with the (outer) cylindrical portion of sleeve 5. Upon tightening the sleeve, the joint between the axial end face of sleeve 5 and the shoulder of end piece 10 is tight. When painted that joint line may no longer even be visible and is completely covered thereby protecting the interior of the assembly. Accordingly, cleaning and the maintenance is facilitated. Particularly, no dirt etc. is expected to accumulate on the inside. The flush arrangement of sleeves and section elements adds significantly to the overall appearance of the frame, due to an uninterrupted contour line along any section element up to the end of the respective sleeves.

The invention is not limited to the embodiments described above but all changes and modifications thereof not constituting departures from the spirit and scope of the invention are intended to be included.

We claim:

1. Joint and connecting structure for section elements in a frame, scaffold or lattice arrangement or the like, wherein section elements with plane axial end faces converge from different directions towards the structure, comprising:

a support element having studs extending in the different directions from the support element, and having a radially outwardly extending flange at their respective outer end with a plane, axial end face;

a plurality of sleeves each with threading at one end and having an overhung ridge or collar, and being rotatably seated respectively on the studs, so that the ridge of a sleeve of the plurality extends behind the flange of the respective stud preventing removal of the sleeves from the studs, each sleeve being axially retained on the respective stud by the flange of the stud and by said support element from which the stud extends, the spacing between said flange and said support element being sufficient to retract the sleeve, so that its threaded front end clears said end face of the flange; and a threaded end piece of a section being welded to the section proper, the end piece having a cylindrical portion of the same outer diameter as the section element, the sleeve having for at least a portion of its axial extension also the same outer diameter, the threaded end piece of the section having a reduced diameter for threaded insertion into the threaded portion of the respective sleeve, the threading of each sleeve adapted for secure connection with the said end piece of the section element, so that an end face of the end piece abuts said end face of the respective flange in a common plane, said flange and said section clear said common plane for lateral placement of said section without axial displacement upon unthreading of the sleeve from the section or prior to threading onto the section.

2. Structure as in claim 1, wherein the axial length of the ridge of a sleeve of the plurality together with the distance of the flange of the respective stud from the support element defines an axial displacement range for the sleeve, at least equal to the axial length of the threading of the sleeve.

* * * * *